US012744485B1

(12) United States Patent
Sanborn et al.

(10) Patent No.: US 12,744,485 B1
(45) Date of Patent: Sep. 22, 2026

(54) SYSTEMS AND METHODS FOR CONTROLLING HIGH VOLTAGE SYSTEMS FOR A MARINE VESSEL

(71) Applicant: Brunswick Corporation, Mettawa, IL (US)

(72) Inventors: James J. Sanborn, Lowell, MI (US); Pramit Baul, North Fond du Lac, WI (US)

(73) Assignee: Brunswick Corporation, Mettawa, IL (US)

( * ) Notice: Subject to any disclaimer, the term of this patent is extended or adjusted under 35 U.S.C. 154(b) by 248 days.

(21) Appl. No.: 18/654,195

(22) Filed: May 3, 2024

(51) Int. Cl.

| | |
|---|---|
| ***H02H 3/00*** | (2006.01) |
| ***B60L 3/00*** | (2019.01) |
| ***B60L 15/20*** | (2006.01) |
| ***B60L 58/10*** | (2019.01) |
| ***B63H 21/17*** | (2006.01) |
| ***H02P 29/028*** | (2016.01) |

(52) U.S. Cl.
CPC .......... *H02P 29/028* (2013.01); *B60L 3/0084* (2013.01); *B60L 15/20* (2013.01); *B60L 58/10* (2019.02); *B63H 21/17* (2013.01)

(58) Field of Classification Search
CPC ..................................................... H02P 29/028
See application file for complete search history.

(56) References Cited

U.S. PATENT DOCUMENTS

| | | | |
|---|---|---|---|
| 6,507,164 | B1 | 1/2003 | Healey et al. |
| 6,902,446 | B1 | 6/2005 | Healey |
| 7,104,856 | B1 | 9/2006 | Krupp et al. |
| 7,586,722 | B2 | 9/2009 | Scholer et al. |
| 9,851,387 | B2 | 12/2017 | Aceña et al. |
| 10,017,136 | B1 | 7/2018 | Waisanen et al. |

(Continued)

OTHER PUBLICATIONS

Park et al., "Outboard Motor," U.S. Appl. No. 29/848,875, filed Aug. 5, 2022 (drawings, specification, and claims only).

(Continued)

*Primary Examiner* — Stephen W Jackson
(74) *Attorney, Agent, or Firm* — Andrus Intellectual Property Law, LLP

(57) ABSTRACT

A power control system for controlling a power circuit of an electric marine propulsion system delivers power from at least one marine battery to a marine drive configured to propel a marine vessel. The power control system includes at least one interlock circuit electrically isolated from the power circuit. The interlock circuit includes a plurality of interlock circuit portions, each interlock circuit portion configured to indicate connectivity of a corresponding portion of the power circuit, a plurality of resistance elements each having a predetermined resistance value, including a resistance element associated with each of the interlock circuit portions, and a control system. The control system is configured to measure a local resistance of each of the plurality of interlock circuit portions so as to measure a plurality of local resistances throughout the interlock circuit, identify a fault condition out of a plurality of possible fault conditions based on the local resistance of each of the interlock circuit portions, identify a fault response based on the identified fault condition, and control the power circuit based on the fault response.

22 Claims, 5 Drawing Sheets

(56) References Cited

U.S. PATENT DOCUMENTS

| | | | | |
|---|---|---|---|---|
| 10,202,180 | B1 | 2/2019 | Amerling et al. | |
| 10,511,121 | B2 | 12/2019 | Milroy et al. | |
| 10,710,691 | B2 | 7/2020 | Amerling et al. | |
| 10,946,865 | B1 * | 3/2021 | Lin | B60W 50/0205 |
| 11,046,405 | B1 | 6/2021 | Groeschel et al. | |
| 11,377,186 | B1 | 7/2022 | Ahlswede et al. | |
| 2018/0115269 | A1 * | 4/2018 | Lin | G01R 31/007 |
| 2019/0128948 | A1 * | 5/2019 | Smith | B60R 16/03 |
| 2022/0024318 | A1 | 1/2022 | Baumann et al. | |
| 2022/0194542 | A1 | 6/2022 | Kirchhoff et al. | |
| 2022/0200070 | A1 | 6/2022 | Gonring | |
| 2022/0328912 | A1 | 10/2022 | Gonring | |
| 2024/0047982 | A1 * | 2/2024 | Green | B60R 16/033 |
| 2024/0158064 | A1 * | 5/2024 | Taylor | B63H 21/17 |

OTHER PUBLICATIONS

Johnson et al., "Battery," U.S. Appl. No. 29/855,548, filed Oct. 4, 2022 (drawings, specification, and claims only).

Avertronics, C2 waterproof connector & wire hareness assy, admitted prior art, available at https://avertronics.com/en/product/c2-waterproof-connector-2021-e-1/.

Avertronics, D1 waterproof connector & wire hareness assy (80A), admitted prior art, available at https://avertronics.com/en/product/d1-waterproof-connector-2021-e-1/.

Amphenol Sine Systems, AHDP04-24-09PR-SRA, product data sheet, May 8, 2020, available at https://www.amphenol-sine.com/pdf/datasheet/AHDP04-24-09PR-SRA.pdf.

Amphenol Sine Systems, AHDP06-24-09PR-SRA, product data sheet, May 12, 2020, available at https://www.amphenol-sine.com/pdf/datasheet/AHDP06-24-09PR-SRA.pdf.

Amphenol Sine Systems, AHDP06-24-09SR-SRA, product data sheet, May 12, 2020, available at https://www.amphenol-sine.com/pdf/datasheet/AHDP06-24-09SR-SRA.pdf.

Amphenol Sine Systems, AHDP04-24-09SR-SRA, product data sheet, May 8, 2020, available at https://www.amphenol-sine.com/pdf/datasheet/AHDP04-24-09SR-SRA.pdf.

Amphenol Sine Systems, AHDP02-24-07PN-WTACL22, product data sheet, Sep. 1, 2020, available at https://www.amphenol-sine.com/pdf/datasheet/AHDP02-24-07PN-WTACL22.pdf.

Amphenol Sine Systems, AHDP06-24-07SN-SRACL22, product data sheet, May 8, 2020, available at https://www.amphenol-sine.com/pdf/datasheet/AHDP06-24-07SN-SRACL22.pdf.

Amphenol Sine Systems, AHDP04-24-07PN-WTACL22, product data sheet, Jul. 6, 2019, available at https://www.amphenol-sine.com/pdf/datasheet/AHDP04-24-07PN-WTACL22.pdf.

Amphenol LTW, PWMU-04BFMB-TL7001, admitted prior art, available at https://www.amphenolltw.com/product-info/Power/Power.PWMU/PWMU-04BFMB-TL7001.html.

Amphenol LTW, PWMU-04RMFS-TS7001, admitted prior art, available at https://www.amphenolltw.com/product-info/Power/Power.PWMU/PWMU-04RMFS-TS7001.html.

Epropulsion, EPropulsion Spirit 1.0 Plus 3HP Electric Outboard Motor, admitted prior art, available at https://tbnation.net/products/epropulsion-spirit-1-0-plus-3hp-electric-outboard-motor?variant=39585207648391¤cy=USD&utm_medium=cpc&utm_source=google&gclid=CjwKCAjwwL6aBhBlEiwADycBlDOC4V7czgl1ST5foKhCsF37-KCbgqHSKNiuvW1sn1oeKx5EfOjQQhoC6RkQAvD_BWE.

Epropulsion, Epropulsion Navy Evo 6.0 LongShaft, admitted prior art, available at https://liquidsurfandsail.com/epropulsion-navy-evo-6-0-longshaft/?sku=NE-6000-LO&utm_source=google&utm_medium=cpc&adpos=&scid=scplpNE-6000-L0&sc_intid=NE-6000-L0&gclid=CjwKCAjwwL6aBhBlEiwADycBlP5gTVPPl11YYGbLWTypeM9Maysj1l3Wu9pUQ2i4HJmecrKz-WzRFhoCQ1EQAvD_BwE.

Fergus et al., U.S. Appl. No. 17/487,116, filed Sep. 28, 2021, "Outboard Motor That is Removable From Transom Clamp Bracket" (specification, claims, and drawings only).

Schrank et al., U.S. Appl. No. 17/509,739, filed Oct. 25, 2021, "Integrated Copilot And Locking Mechanism For Marine Drives" (specification, claims, and drawings only).

Nickols et al., U.S. Appl. No. 17/884,355, filed Aug. 9, 2022, "Transom Bracket Assemblies for Supporting a Marine Drive on a Vessel" (specification, claims, and drawings only).

Kalnins et al., U.S. Appl. No. 17/695,200, filed Mar. 15, 2022, "Electric Marine Propulsion System and Control Method" (specification, claims, and drawings only).

Park et al., U.S. Appl. No. 29/848,875, filed Aug. 5, 2022, "Outboard Motor" (specification, claim, and drawings only).

Johnson et al., U.S. Appl. No. 29/855,548, filed Oct. 4, 2022, "Battery" (specification, claims, and drawings only).

Fletcher, U.S. Appl. No. 17/939,474, filed Sep. 7, 2022, "Marine Drives and Apparatuses for Steering Marine Drives and for Routing Flexible Rigging Connectors on Marine Drives" (specification, claims, and drawings only).

McEathron et al., U.S. Appl. No. 17/972,691, filed Oct. 25, 2022, "Marine Drives and Apparatuses for Steering Marine Drives and for Routing Flexible Rigging Connectors on Marine Drives" (specification, claims, and drawings only).

Amphenol Sine Systems, AHDP04-24-08PN-M1WTA, product data sheet, Sep. 22, 2021.

Amphenol Sine Systems, AHDP06-24-08SN-M1WTA, product data sheet, Sep. 22, 2021.

Amphenol Sine Systems, AHDP02-24-08PN-M1SRA, product data sheet, Sep. 22, 2021.

Tech Note: HVIL Diagnostic Guide, Tesla Motors, Inc. 13 pages, Jun. 26, 2013.

* cited by examiner

SYSTEMS AND METHODS FOR CONTROLLING HIGH VOLTAGE SYSTEMS FOR A MARINE VESSEL

FIELD

The present disclosure generally relates to systems and methods for controlling a high voltage system on a marine vessel, and more particularly systems and methods for controlling a power circuit of an electric marine propulsion system.

BACKGROUND

The following U.S. Patents and applications provide background information and are incorporated herein by reference, each in its entirety:

U.S. Publication No. 2022/0194542 discloses a method of controlling an electric marine propulsion system configured to propel a marine vessel including measuring at least one parameter of an electric motor in the electric marine propulsion system and determining that the parameter measurement indicates an abnormality in the electric marine propulsion system. A reduced operation limit is then determined based on the at least one parameter measurement, wherein the reduced operation limit includes at least one of a torque limit, an RPM limit, a current limit, and a power limit. The electric motor is then controlled such that the reduced operation limit is not exceeded.

U.S. application Ser. No. 17/985,682 discloses a battery that includes at least one battery cell, a bidirectional port configured to provide current output to a load from the at least one battery cell and to receive a charge current from a battery charger to charge the at least one battery cell, a charge only port configured to receive charge current from the battery charger to charge the at least one battery cell, and a battery control system. The battery control system is configured to detect a connection status of the bidirectional port and/or the charge only port and, based on the connection status of each port, to control the battery between a power delivery mode where current can flow from the at least one battery cell out of the bidirectional port, a charge mode where current can from the bidirectional port or the charge only port to the at least one battery cell, and a disconnected mode where current cannot flow between the bidirectional port or the charge only port and the at least one battery cell.

U.S. application Ser. No. 18/054,804 discloses a marine propulsion system that includes a marine drive having an electric motor powerhead, at least one marine battery, at least a first connection cable having a connector configured to removably connect to a drive port on a housing of the marine drive, and an interlock circuit. The interlock circuit is configured to provide a completed circuit when the at least one battery and the marine drive are connected via at least the first connection cable, wherein the interlock circuit is independent from a power circuit delivering power from the at least one marine battery to the marine drive. The at least one battery is configured to identify whether the interlock circuit is completed and to control an internal disconnect to connect to the power circuit when the interlock circuit is completed and to disconnect from the power circuit when the interlock circuit is opened.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In one aspect of the disclosure, a power control system for controlling a power circuit of an electric marine propulsion system delivers power from at least one marine battery to a marine drive configured to propel a marine vessel. The power control system includes at least one interlock circuit electrically isolated from the power circuit. The interlock circuit includes a plurality of interlock circuit portions, each interlock circuit portion configured to indicate connectivity of a corresponding portion of the power circuit, a plurality of resistance elements each having a predetermined resistance value, including a resistance element associated with each of the interlock circuit portions, and a control system. The control system is configured to measure a local resistance of each of the plurality of interlock circuit portions so as to measure a plurality of local resistances throughout the interlock circuit, identify a fault condition out of a plurality of possible fault conditions based on the local resistance of each of the interlock circuit portions, identify a fault response based on the identified fault condition, and control the power circuit based on the fault response.

In one embodiment, the control system is configured to associate each of the plurality of possible fault conditions with a corresponding fault response.

In another embodiment, the fault response is further based on an operation state of the power circuit.

In another embodiment, each of the corresponding fault responses includes at least one of disconnecting the at least one marine battery from the power circuit, disconnecting the marine drive from the power circuit, controlling the at least one marine battery to provide a reduced power amount on the power circuit, controlling the at least one marine drive to draw a reduced power draw, preventing charging of the at least one marine battery, conducting a plausibility check, generating an alert on a user interface, and storing a fault code associated with the fault condition.

In another embodiment, the at least one interlock circuit is configured such that each of the resistance elements is in parallel with the associated interlock circuit portion, and wherein the control system is further configured to identify the fault condition based on the local resistance being equal to the predetermined resistance value for the respective resistance element.

In another embodiment, wherein the at least one interlock circuit is configured such that each interlock circuit portion provides a short circuit across the respective resistance element when the corresponding portion of the power circuit is connected such that the local resistance for that interlock circuit portion is effectively zero when the corresponding portion of the power circuit is connected.

In another embodiment, each of the plurality of resistance elements is configured to have a unique resistance value, and wherein the control system is configured to measure a total resistance of each of the at least one interlock circuit and to identify the fault condition based on a comparison between the total resistance and the plurality of unique resistance values.

In another embodiment, the control system includes at least one battery controller for the at least one marine battery, wherein the at least one battery controller is configured to measure the total resistance of the interlock circuit, to generate a battery-identified fault condition based on the comparison between the total resistance and plurality of unique resistance values.

In another embodiment, the control system further includes a central controller, wherein the battery controller is configured to communicate at least one of the total resistance and the battery-identified fault condition to the central controller, and wherein the central controller is configured to identify the fault condition based on the local resistance of each of the interlock circuit portions and/or the total resistance or battery-identified fault condition.

In another embodiment, the control system is configured to measure a total resistance of the at least one interlock circuit and/or each of the local resistances using an AC current. In another embodiment, the AC current is a biased sine wave wherein the AC current is maintained above zero.

In another embodiment, the at least one interlock circuit includes at least two independent interlock circuits, including a propulsion interlock circuit configured to indicate connectivity of a propulsion power circuit portion of the power circuit connected to the marine drive and a storage interlock circuit configured to indicate connectivity of the at least one marine battery.

In another embodiment, wherein the storage interlock circuit further includes interlock circuit portions each configured to indicate connectivity of a respective portion of the power circuit, including a connection of a charger, an inverter, a DC/DC converter, an isolation monitor, and/or a lid switch, and wherein the fault condition indicates which the marine battery, the charger, the DC/DC converter, the inverter, the isolation monitor, and/or the lid switch is a source of the fault.

In another aspect of the disclosure, a method of a power circuit of an electric marine propulsion system, wherein the power circuit delivers power from at least one marine battery to a marine drive configured to propel a marine vessel, includes providing at least one interlock circuit electrically isolated from the power circuit, the at least one interlock circuit comprising a plurality of interlock circuit portions, each interlock circuit portion configured to indicate connectivity of a corresponding portion of the power circuit and comprising a resistance element with a unique resistance value such that interlock circuit comprises a plurality of unique resistance values, measuring a total resistance of the interlock circuit, identifying a fault condition of the power circuit based on the total resistance and the plurality of unique resistance values, identifying a fault response based on the fault condition, and controlling the power circuit based on the fault response.

In one embodiment, the fault condition is a selected one of a plurality of possible fault conditions for the power circuit, and wherein each of the plurality of possible fault conditions has a corresponding fault response.

In another embodiment, the fault response is identified further based on an operation state of the marine drive.

In another embodiment, each of the corresponding fault responses includes at least one of disconnecting the at least one marine battery from the power circuit, disconnecting the marine drive from the power circuit, controlling the at least one marine battery to provide a reduced power amount on the power circuit, controlling the at least one marine drive to draw a reduced power draw, preventing charging of the at least one marine battery, and conducting a plausibility check, generating an alert on a user interface, and storing a fault code associated with the fault condition. In another embodiment, the method further includes measuring a local resistance of each of the plurality of interlock circuit portions so as to measure a plurality of local resistances throughout the interlock circuit, and identifying the fault condition based further on plurality of local resistances.

In another embodiment, the at least one interlock circuit is configured such that each of the resistance elements is in parallel with the associated interlock circuit portion, wherein identifying the fault condition includes determining that at least one of the local resistances is equal to the unique resistance value for the respective resistance element.

In another embodiment, the method further includes with at least one battery controller, measuring the total resistance of the interlock circuit and comparing the total resistance and the plurality of unique resistance values to generate a battery-identified fault condition, and communicating the battery-identified fault condition to a central controller, and with the central controller, measuring the total resistance of the interlock circuit, identifying the fault condition based on the total resistance, plurality of unique resistance values, and further based on the battery-identified fault condition.

In another embodiment, the method further includes measuring the total resistance of the at least one interlock circuit with an AC current, wherein the AC current is a biased sine wave.

In another embodiment, interlock circuit portions are each configured to indicate connectivity the at least one marine battery, the marine drive, a charger, an inverter, an isolation monitor, and/or a lid switch, and wherein method further includes identifying which of the at least one marine battery, the marine drive, the charger, the inverter, the isolation monitor, and/or the lid switch is a source of the fault condition based on the total resistance and the plurality of unique resistance values.

BRIEF DESCRIPTION OF THE DRAWINGS

The present disclosure includes the following Figures.

DETAILED DESCRIPTION

Figure 1:
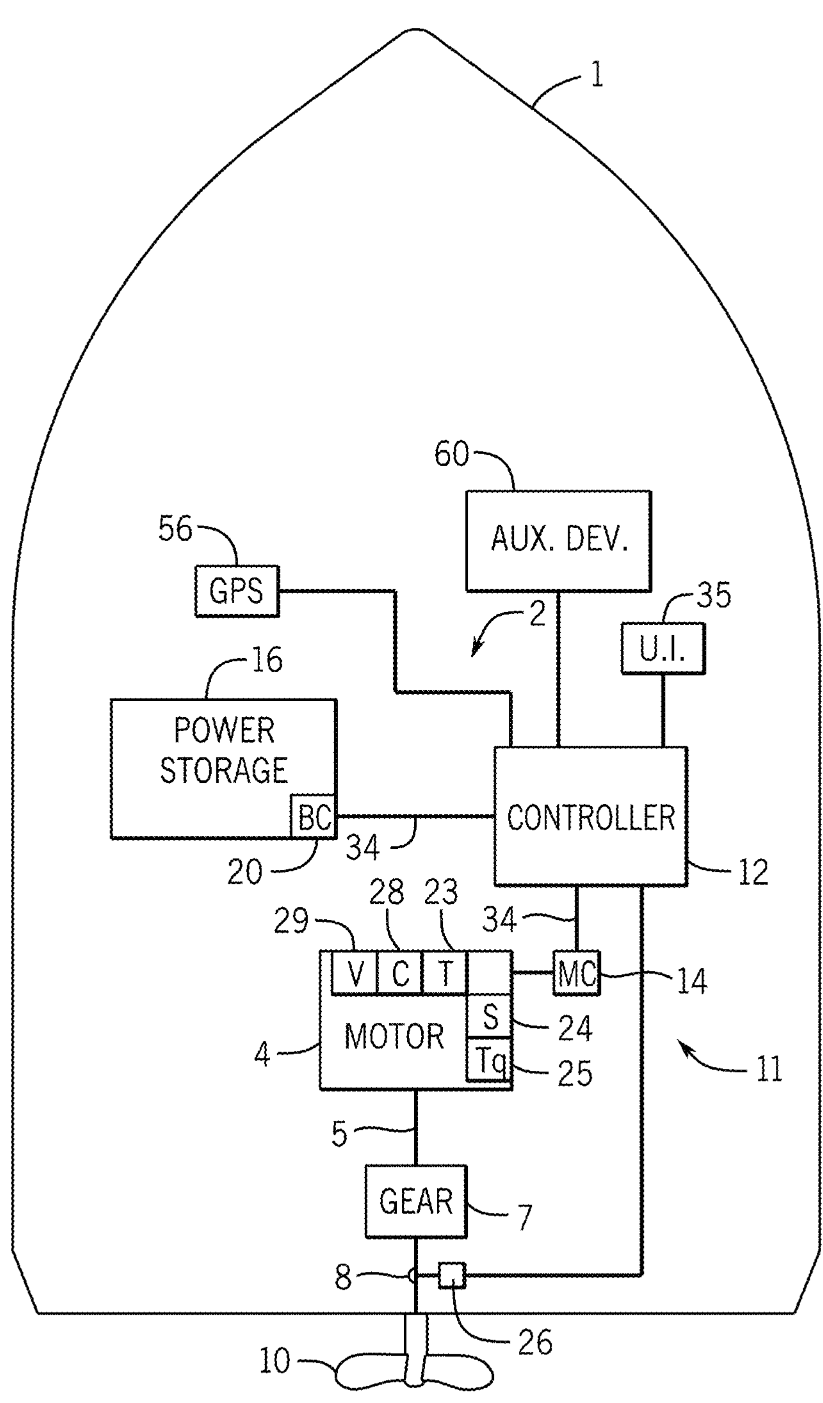
FIG. 1 is a schematic depiction of a marine vessel having an exemplary electric marine propulsion system according to one embodiment of the present disclosure.

The present disclosure relates to controlling connection of high voltage batteries to an electrical load for a high voltage system on a marine vessel. The risks of damage due to a lack of electrical isolation are increased for a marine vessel, where water is ever-present and can make contacts and shorts that would not occur without the presence of conductive water. Likewise, on land if an electric vehicle detects a fault within the power circuit, disengagement of a high voltage propulsion system still allows for assistance accessibility, such as a driver being able to leave the vehicle or a tow truck being able to reach an electric vehicle, whereas these points of accessibility are highly limited in a marine environment.

Given those challenges, the inventors developed the disclosed method and system for controlling a high voltage system by controlling connectivity of portions of the power circuit using an electrically isolated interlock circuit. The disclosed power control system includes at least one interlock circuit and is configured to differentiate fault responses based on the fault condition to prevent an automatic disengagement of the electric marine propulsion system when a fault condition is detected. The interlock circuit includes interlock circuit portions that are configured to indicate connectivity of a corresponding portion of the power circuit. Each interlock circuit portion includes a resistance element having a predetermined resistance value. For example, each of the resistance elements is a resistor in parallel with the associated interlock circuit portion such that the resistor is only measurable on the circuit when the corresponding portion of the power circuit is disconnected. Thus the control system is configured to identify the fault condition based on the local resistance being equal to the predetermined resistance value for the respective resistance element. In other embodiments, the resistance elements may be configured in series with the respective circuit portions, and the logic used by the controller for assessing the HVIL based on resistances would be adjusted accordingly (e.g., where detection of the resistance indicates that the corresponding interlock circuit portion is connected and thus the corresponding portion of the power circuit is also connected).

A fault condition indicating a particular fault in the power circuit may be detected by measuring the total resistance of the interlock circuit and comparing the total resistance to a plurality of known unique resistances of the interlock circuit portions, measuring a local resistance of each of the interlock circuit portions through local controller(s) and determining the faults based on the local resistance values, or both. When a fault condition is identified, an appropriate fault response can be identified based on the identified fault condition and the power circuit is controlled based on the fault response. Namely, the fault response is tailored for responding to the fault condition and the system may be configured to enact fault responses that prioritize maintaining at least limited propulsion output so that the operator can return to the vessel to shore. Even in circumstances where the propulsion system or the battery may be damaged, thrust output may be permitted at a reduced output value to enable the marine vessel to reach the shore and the user is not stranded in the middle of the water. In some embodiments, the fault response is based on the fault condition and the operation state of the power circuit, such as whether a marine drive is being powered to generate a propulsion output or whether a charge current is being delivered to charge one or more batteries on the vessel.

FIG. 1 depicts an exemplary embodiment of a marine vessel 1 having an electric marine propulsion system 2 configured to propel the marine vessel in a direction instructed by an operator via a steering control system, or by a guidance system configured to automatically control steering of the marine vessel to steer the vessel toward a predetermined location or global position. The electric propulsion system 2 may include at least one electric marine drive 3 having an electric motor 4 configured to propel the marine vessel 1 by rotating a propeller 10. The electric marine propulsion system 2 may include an outboard marine drive 3 having an electric motor 4 housed therein, such as housed within the cowl of the outboard marine drive. A person of ordinary skill in the art will understand in view of the present disclosure that the marine propulsion system 2 may include other types of electric marine drives 3, such as inboard drives or stern drives.

The electric marine propulsion system 2 may include one or a plurality of electric marine drives 3, each comprising at least one electric motor 4 configured to rotate a propulsor, or propeller 10. The motor 4 may be, for example, a brushless electric motor, such as a brushless DC motor. In other embodiments, the electric motor may be a DC brushed motor, an AC brushless motor, a direct drive, a permanent magnet synchronous motor, an induction motor, or any other device that converts electric power to rotational motion. In certain embodiments, the electric motor 4 includes a rotor and a stator in a known configuration.

The electric motor 4 is electrically connected to and powered by a power storage system 16. The power storage system 16 stores energy for powering the electric motor 4 and is rechargeable, such as by connection to shore power when the electric motor 4 is not in use. Various power storage devices and systems are known in the relevant art. The power storage system 16 may be a battery system including one or more batteries or banks of batteries. For example, the power storage system 16 may include one or more lithium-ion (LI) battery systems, each LI battery comprised of multiple battery cells. In other embodiments, the power storage system 16 may include one or more lead-acid batteries, fuel cells, flow batteries, ultracapacitors, and/or other devices capable of storing and outputting electric energy.

The electric motor 4 is operably connected to the propeller 10 and configured to rotate the propeller 10. As will be known to the ordinary skilled person in the relevant art, the propeller 10 may include one or more propellers, impellers, or other propulsor devices and that the term "propeller" may be used to refer to all such devices. In certain embodiments, such as that represented in FIG. 1, the electric motor 4 may be connected and configured to rotate the propeller 10 through a gear system 7 or a transmission. In such an embodiment, the gear system 7 translates rotation of the motor output shaft 5 to the propeller shaft 8 to adjust conversion of the rotation and/or to disconnect the propeller shaft 8 from the drive shaft 5, as is sometimes referred to in the art as a "neutral" position where rotation of the drive shaft 5 is not translated to the propeller shaft 8. Various gear systems 7, or transmissions, are well known in the relevant art. In other embodiments, the electric motor 4 may directly collect to the propeller shaft 8 such that rotation of the drive shaft 5 is directly transmitted to the propeller shaft 8 at a constant and fixed ratio.

The power storage system 16 may further include a battery controller 20 configured to monitor and/or control aspects of the power storage system 16. The battery controller 20 may further be configured to receive information from current, voltage, and/or other sensors within the power storage system 16, such as to receive information about the voltage, current, and temperature of each battery cell or group of battery cells within the power storage system 16. For example, the battery controller 20 may receive inputs from one or more sensors within the power storage system 16, such as one or more voltage, current, and temperature sensors within a housing for the power storage system 16. Voltage sensors may be configured to sense voltage within the battery (such as cell voltage sensors configured to sense the voltage of individual cells or groups of cells in a LI battery), and one or more temperature sensors may be configured to sense a temperature within a housing of the power storage device where one or more batteries or other storage elements are located. The battery controller 20 or other controller in the system is configured to calculate a charge level, such as a state of charge, of the power storage system 16.

A control system 11 controls the electric marine propulsion system 2, wherein the control system 11 may include a plurality of control devices configured to cooperate to provide the method of controlling the electric marine propulsion system described herein. For example, the control system 11 includes a central controller 12, the battery controller 20, and one or more motor controllers, trim controllers, steering controllers, etc. communicatively connected, such as by a communication bus. Within the control system 11, controllers other than the central controller may be identified as local controllers, wherein the actual type of controller (such as a motor controller or a steering controller) may measure a localized portion of the interlock circuit. In one embodiment, the local controllers may transmit measurements within the local portion of the interlock circuit to the central controller. A person of ordinary skill in the art will understand in view of the present disclosure that other control arrangements could be implemented and are within the scope of the present disclosure, and that the control functions described herein may be combined into a single controller or divided into any number of a plurality of distributed local controllers that are communicatively connected.

Each controller may comprise a processor and a storage device, or memory, configured to store software and/or data utilized for controlling and/or tracking operation of the electric propulsion system 2. The memory may include volatile and/or non-volatile systems and may include removable and/or non-removable media implemented in any method or technology for storage of information. The storage media may include non-transitory and/or transitory storage media, including random access memory, read only memory, or any other medium which can be used to store information and be accessed by an instruction execution system, for example. An input/output (I/O) system provides communication between the control system 11 and peripheral devices.

Each electric motor 4 may be associated with a motor controller 14 configured to control power to the electric motor, such as to the stator winding thereof. The motor controller 14 is configured to control the function and output of the electric motor 4, such as controlling the torque outputted by the motor, the rotational speed of the motor 4, as well as the input current, voltage, and power supplied to and utilized by the motor 4. Reductions in torque or thrust output may be commanded by the central controller or the motor controller based on a detected fault condition, wherein the electric motor 4 is operated at a reduced capacity based on the output limit commanded as part of the fault response. In one arrangement, the motor controller 14 controls the current delivered to the stator windings via the leads, which input electrical energy to the electric motor to induce and control rotation of the rotor. In certain embodiments, various sensing devices 23-25, 26, and 28-29, may be configured to communicate with a local controller, such as the motor controller 14 or battery controller 20, and in other embodiments the sensors 23-25, 26, and 28-29 may communicate with the central controller 12 and one or more of the motor controller 14 and or battery controller 20 may be eliminated. As an illustrative example, when testing electrical connectivity of the marine vessel electrical system and/or one or more of the batteries, data received by the central controller 12 from the current sensor 28 and/or the voltage sensor 29 may confirm electrical connectivity of the marine vessel electrical system or the one or more batteries being tested. The controllers 12, 14, 20 (and/or the various sensors and systems) may be configured to communicate via a communication bus such as a CAN bus or a LIN bus, or by single dedicated communication links 34 between controllers 12, 14, 20.

Upon connecting the one or batteries to power the marine vessel electrical system, sensors may be configured to sense the power, including the current and/or voltage, delivered to the power circuit on the marine vessel, including to the motor 4. For example, a voltage sensor 29 may be configured to sense the input voltage to the motor 4 and a current sensor 28 may be configured to measure input current to the motor 4. Accordingly, such value(s) can be used for determining the operation state of the power circuit, such as whether the marine drive is being powered and/or is operating. In one embodiment, measurements received by the control system from the current sensor 28 and/or the voltage sensor 29 may be compared or used in tandem with measurements received from the propulsion interlock circuit 106 depicted in FIG. 2 that includes the motor and inverter 164 to detect faults within the power circuit connection to the motor/inverter 164. In the depicted example of FIG. 1, the voltage sensor 29 and current sensor 28 may be communicatively connected to the motor controller 14 to provide measurement of the voltage supplied to the motor and current supplied to the motor. The motor controller 14 is configured to provide appropriate current and/or voltage to meet the demand for controlling the motor 4. For example, a demand input may be received at the motor controller 14 from the central controller 12, such as based on an operator demand at a helm input device, such as the throttle lever 38. As another example, output of the motor 14 may be reduced, or limited, as part of a fault response, based on the type of fault detected by the control system. In certain embodiments, the motor controller 14, current sensor 28, and voltage sensor 29 may be integrated into a housing of the electric motor 4, in other embodiments the motor controller 14 may be separately housed.

In one embodiment, the central controller 12 communicates with the motor controller 14 via communication link 34, such as a CAN bus. The controller also receives input from and/or communicates with one or more user interface devices in the user interface system via the communication link, which in some embodiments may be the same communication link as utilized for communication between the controllers 12, 14, 20 or may be a separate communication link. A steering wheel is provided, which in some embodiments may communicate with the controller 12 to effectuate steering control over the marine drive 3, which is well-known and typically referred to as steer-by-wire arrangements. Various steer arrangements, such as various steer-by-wire arrangements and/or mechanically connected steering arrangements, are well-known in the art and could alternatively be implemented.

The power storage system 16 may be configured to power auxiliary devices 60 on the marine vessel that are not part of the propulsion system 2. For example, the auxiliary devices may include a bilge pump, a cabin lights, a stereo system or other entertainment devices on the vessel, a water heater, a refrigerator, an air conditioner or other climate/comfort control devices on the vessel, communication systems, navigation systems, or the like. Some or all of these accessory devices are sometimes referred to as a "house load" and may consume a substantial amount of battery power. In one embodiment, the auxiliary devices 60 may be part of the marine vessel electrical system and the isolation testing may be configured to test electrical isolation of the house load as part of the marine vessel electrical system. The interlock circuit may be configured to test the connectivity of these elements, such as comprising an interlock circuit portion configured to indicate connectivity of one or more of the various house load elements and thus to detect a fault condition related thereto.

In one embodiment, the control system may be configured to use switches to disconnect the batteries from the marine vessel electrical system (and vice versa) in the event of a fault condition. Similarly, the system may include one or more switches configured to disconnect the marine drive from the power circuit and/or to disconnect other elements from the power circuit. Each switch may be any of various switch arrangements and configurations, such as a MOSFET configured to operate as a switch or physical contactors. The sets of switches are connected between the marine vessel electrical system and the batteries so as to selectively electrically connect and disconnect the marine vessel electrical system to/from the batteries or other devices. The switches may be configured to permit connection of one or a plurality of batteries and may be configured to allow connection and disconnection of batteries together as a unit or individually.

Figure 2:
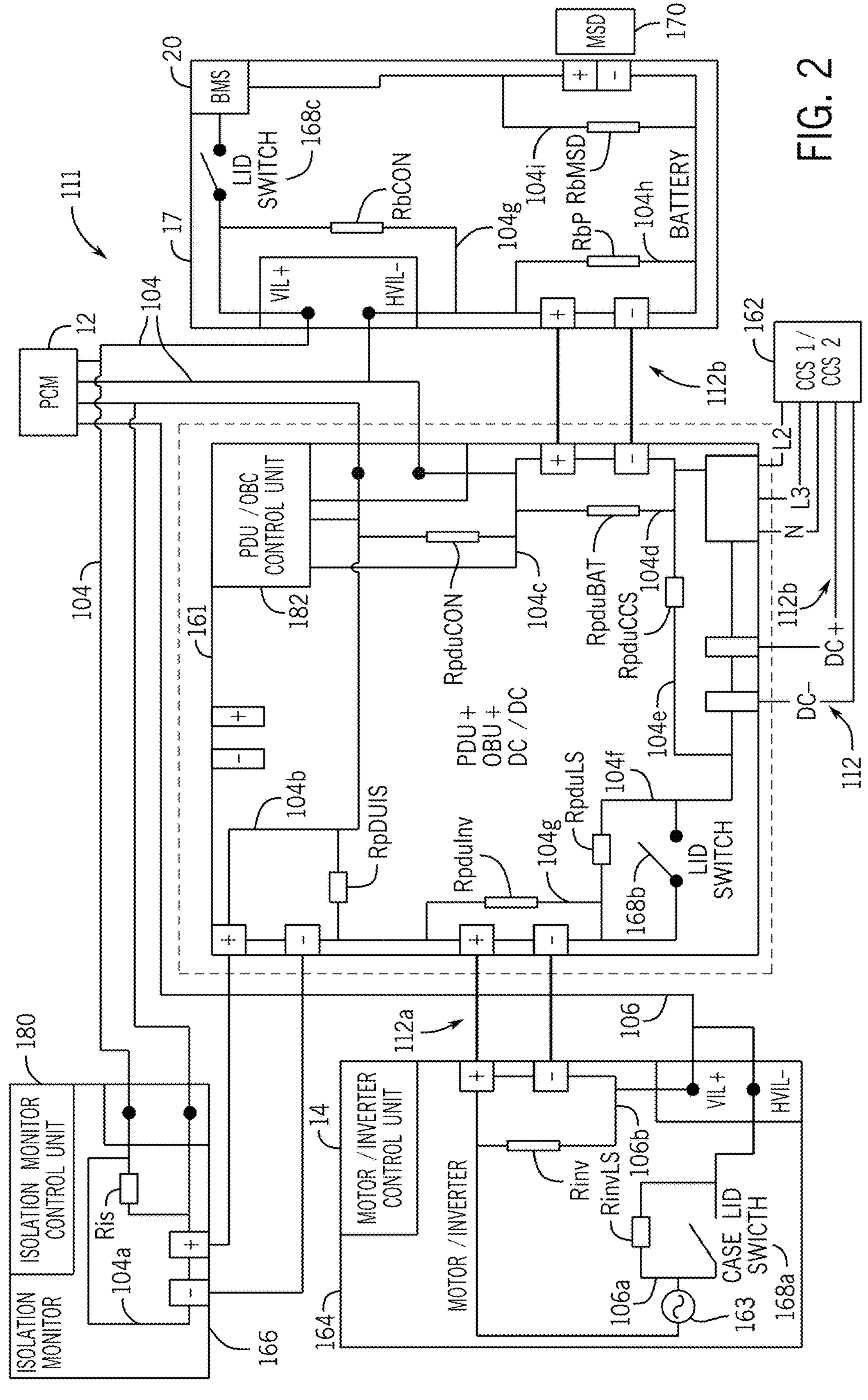
FIG. 2 is a schematic of an exemplary high voltage system for a marine vessel in accordance with the present disclosure.
Figure 3:
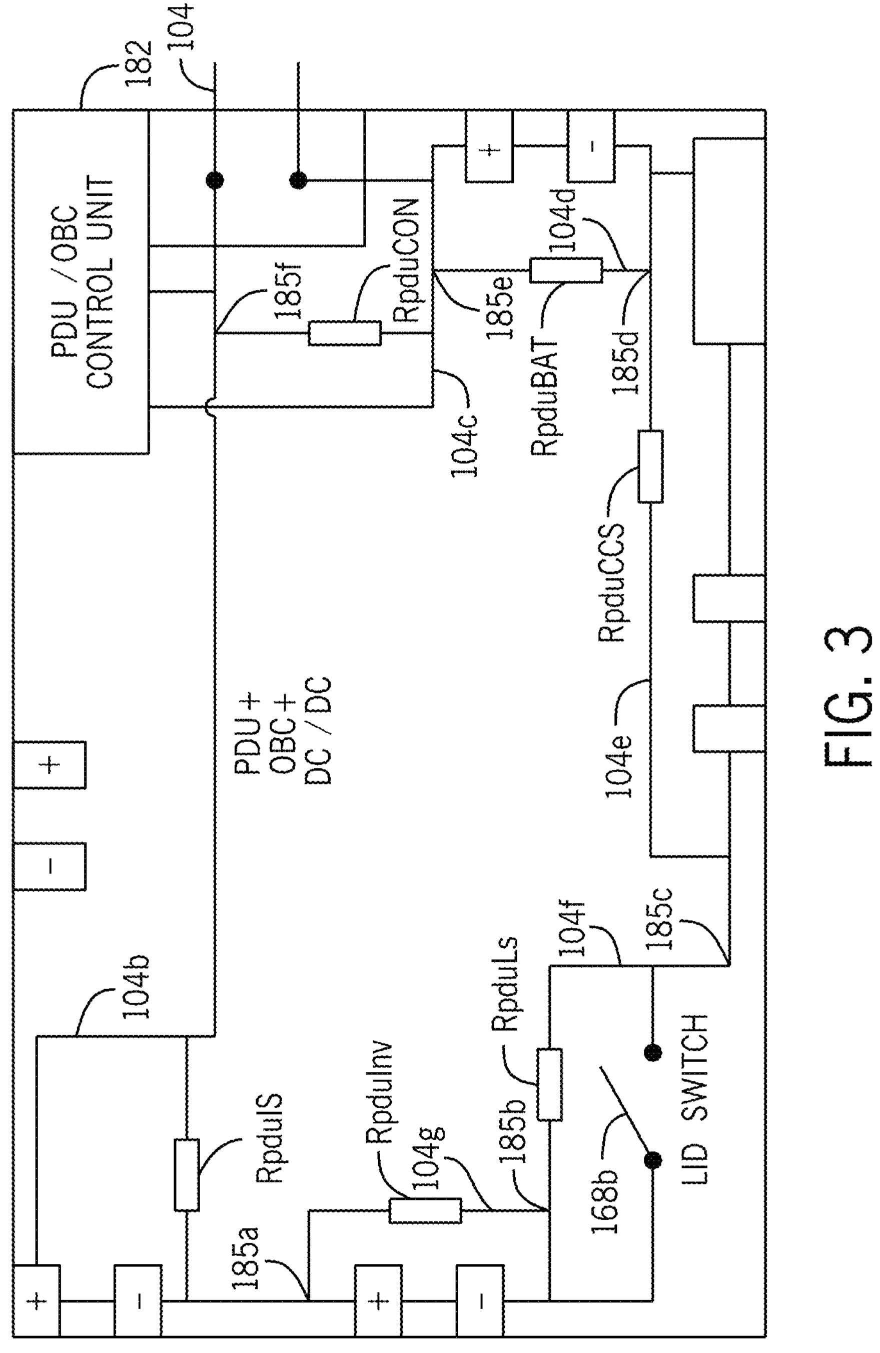
FIG. 3 is a schematic of a PDU within an exemplary high voltage system for a marine vessel in accordance with the present disclosure.

FIG. 2 and FIG. 3 illustrate a power control system 111 for controlling a power circuit 112 of an electric marine propulsion system, wherein the power circuit 112 delivers power from at least one marine battery to a marine drive configured to propel a marine vessel and/or to other devices, as well as charging power to charge the at least one battery from an external power source. The power control system 111 includes at least one high voltage interlock circuit (HVIL) 104, 106 electrically isolated from the power circuit. The HVIL 104, 106 runs in parallel with the power circuit 112 but is galvanically isolated therefrom. For example, the HVIL 104, 106 includes portions that run through each connector configured to connect power cords between devices in the power circuit 112, such as cords connecting the battery 17 to the power distribution unit (PDU) 161, connecting the charger connectors 162 to the battery charging system (here, shown integrated with the PDU 161), and/or connecting to powered devices such as the marine drive (including the motor/inverter 14), the isolation monitor 166, etc. For example, if a given connector is not connected or is insufficiently connected, then the portion of the interlock circuit running through that connector will be an open circuit, in which case the current will be routed through the corresponding resistor. In some embodiments, the connectors may be configured such that the HVIL connection breaks before the power connection (e.g. where the HVIL connection pins in the connector are shorter than the power circuit connection pins and thus the HVIL pin connection breaks first as the connector becomes dislodged).

Similarly, the HVIL 104, 106 includes portions that run through certain monitored switches 168 (e.g., lid switches 168*a*-168*c* associated with access points to the housings enclosing various elements in the power control system 111 (e.g., motor cowling, PDU housing, or battery housing). Thus, the HVIL 104, 106 is configured to detect whether each switch 168 is closed or open, and thus whether the corresponding lids to access ports in the housings are closed or open. Thereby, the HVIL 104, 106 is configured to engage certain fault responses if the housing access ports are open (e.g., indicating that a person may be accessing and/or working on the system). For example, the system 11 may be configured to disallow starting the motor if the lid switch 168*a* to the cowling of the marine drive is open. Similarly, the system 11 may be configured to disable power output and input to the battery 17 if the lid switch 168*c* to the battery housing is open.

In the depicted embodiment, the power control system 111 includes a propulsion interlock circuit 106 configured to indicate connectivity of a propulsion power circuit portion 112*a* of the power circuit 112 and a storage interlock circuit 104 configured to indicate connectivity of the at least one marine battery and/or connection of other systems in the storage power circuit portion 112*b* relating to power storage and conditioning, such as a charger, an inverter, a DC/DC converter, an isolation monitor, and/or one or more lid switches. However, in another embodiment, the propulsion interlock circuit 106 and the storage interlock circuit 104 may be configured a as a single HVIL. circuit Alternatively, there may be a plurality of separate HVIL circuits, which may be divided differently than shown, such as according to the requirements of the power circuit or based on the capabilities of the controller(s) operating as part of the power control system.

Each interlock circuit 104, 106 may include a plurality of interlock circuit portions. Each interlock circuit portion is configured to assess connectivity of a corresponding portion of the power circuit 112 using a plurality of resistance elements, one associated with each interlock circuit portion. In the depicted embodiment, each interlock circuit portion 104*a*-104*i* and 106*a*-106*b* includes a resister. In some implementations, each resistor has a unique resistance value, wherein each unique resistance value is associated with a respective one of the interlock circuit portions 104*a*-104*i* and 106*a*-106*b*. In the depicted embodiment, each resistance element is positioned in parallel with the leg of the interlock circuit portion monitoring the power circuit connection. Thus, where the control system 111 measures a resistance that is about to (e.g., within a predetermined range of) the unique resistance value, it detects a related fault, such as a failed/faulted connection of the corresponding portion of the power circuit, an open lid switch, etc. Conversely, where all portions of the power circuit 112 are fully connected, all lid switches are closed, etc. the total resistance of the interlock circuit will be very low, such as within a predetermined range of zero—i.e., the resistors in the interlock circuits 104, 106 are all short-circuited.

As depicted, each interlock circuit 104, 106 may receive power from an independent power source that powers the interlock circuit even if it is not connected to the battery 17, such as the HVIL power source 163 providing power to the propulsion interlock circuit 106. The power source for the storage interlock circuit may be incorporated in the central controller 12, the PDU 161, the battery controller 20, or multiple power sources may be included. The control system may be configured to measure the total resistance of each independent interlock circuit 104, 106 and/or each of the local resistances of each interlock circuit portion 104*a*-104*i* and 106*a*-106*b* using an AC current, such as a biased sine wave wherein the AC current is maintained above zero.

Each of the plurality of resistance elements may be configured to have a unique resistance value of predetermined values such that the control system 111 can be configured to identify the fault condition by measuring the total resistance of the interlock circuit 104, 106. based on a comparison between the total resistance of the interlock circuit 104, 106 and the plurality of unique resistance values. Various controllers 12, 14, 20, 180, 182 in the control system 111 may be configured to measure the total resistance. For example, the total resistance of each interlock circuit 104, 106 may be measured by the central controller 12. Alternatively or additionally, any of the local controllers 14, 20, 180, 182 in the control system 111 may be configured to measure the total resistance of the interlock circuit 104, 106 it is connected to. The control system may identify the source of the fault condition by comparing the total resistance with the plurality of unique resistances of the resistors in the interlock circuit 104, 106 and identify the fault condition accordingly.

In one embodiment, the unique resistances may each have a predetermined resistance value that is known in the control system, wherein the resistance values are selected such that any combination of the resistances included in the total resistance value can be mathematically identified. In one embodiment, the unique resistance values are determined by selecting each resistance value such that each combination of resistance values in the set has a unique sum. These sums, and unique combinations that form the sum may be stored in the memory of the controller, such as in a key-value pair format where the key is the sum and the value is the combination of resistances and/or list of associated monitored functions associated with the respective resistances. Since each sum is mapped to a unique combination of resistors, the controller can map the measured total resistance to the combination of resistors needed to make the unique sum. In one embodiment, the unique resistance values may be incrementally selected wherein, if the addition of a resistor value while incrementing causes a duplicate sum, that number is discarded and the value is incremented again.

Referring to FIGS. 2 and 3, interlock circuits 104, 106 are illustrated having various interlock circuit portions, each associated with a corresponding resistance element. The section of the interlock circuit 104 within the PDU 161 includes multiple interlock circuit portions. Interlock circuit portion 104*b* is configured to monitor connection of the isolation monitor 166 and is associated with resistance element RpduIS. Thus, a fault relating to the isolation monitor connection at the PDU 161 will be detected if the known resistance of resistance element RpduIS is measured, either locally by the PDU controller 182 or as part of the total resistance value measured by any controller within the control system 111.

Interlock circuit portion 104*c* is configured to monitor the connection point at the PDU 161 with the central controller 12 and is associated with resistance element RpduCON. Thus, a fault relating to connection of the central controller 12 at the PDU 161 will be detected if the known resistance of resistance element RpduCON is measured, either locally by the PDU controller 182 or as part of the total resistance value measured by any controller within the control system 111.

Interlock circuit portion 104*d* is configured to monitor the input connector at the PDU 161 to the battery 17 and is associated with resistance element RpduBAT. Thus, a fault relating connection of the input connector from battery 17 (i.e., the connection of the power cord from the battery 17) will be detected if the known resistance of resistance element RpduBAT is measured, either locally by the PDU controller 182 or as part of the total resistance value measured by any controller within the control system 111.

Interlock circuit portion 104*e* is configured to monitor the connection of the charger connector 162 to an external power source, such as to shore power (here, the battery charger is integrated into and comprises part of the PDU). Interlock circuit portion 104*e* is associated with resistance element RpduCCS. Thus, a fault relating to the charger connector not being connected to a power source will be detected if the known resistance of resistance element RpduCCS is measured, either locally by the PDU controller 182 or as part of the total resistance value measured by any controller within the control system 111.

Interlock circuit portion 104*f* is configured to monitor connection of the lid switch 168*b* and is associated resistance element RpduLS. Thus, the fault relating to the lid switch 168*b* being open will be detected if the known resistance value of resistance element RpduLS is measured, either locally by the PDU controller 182 or as part of the total resistance value measured by any controller within the control system 111.

Interlock circuit portion 104*g* is configured to monitor connection at the PDU 161 to the motor/inverter 164 and is associated with resistance element RpduInv. Thus, a fault relating no connection or insufficient connection to the motor/inverter 164 will be detected if the known resistance of resistance element RpduInv is measured, either locally by the PDU controller 182 or as part of the total resistance value measured by any controller within the control system 111.

The storage interlock circuit 104 may run through multiple system elements in addition to the PDU 161 involved in power storage and conditioning, such as including the battery(ies) 17 and the isolation monitor 166, and each section may include one or more interlock circuit portions. Here, the section of the interlock circuit 104 in the isolation monitor includes interlock circuit portion 104*a* is configured to monitor connection of the isolation monitor to the central controller 12 and is associated with resistance element Ris. Thus, a fault relating to the communication and/or power connection at the isolation monitor to the central controller 12 will be detected if the known resistance of resistance element Ris is measured, either locally by the isolation monitor controller 180 or as part of the total resistance value by any controller within the control system 111.

The section of the interlock circuit 104 in the battery may likewise include multiple interlock circuit portions 104*g*-104*i*, such as configured to components within the battery 17 that might be sources of a fault within the storage power circuit portion 112*b*. Interlock circuit portion 104*g* is configured to monitor connection between the battery and the central controller 12 and is associated with the resistance element RbCON. Thus, a fault relating to connection between the battery 17 and the central controller 12 will be detected if the known resistance of resistance element RbCON is measured, either locally by the battery controller 20 or as part of the total resistance value by any controller within the control system 111.

Interlock circuit portion 104*h* is configured to monitor connection at the battery side of the power connector cable connecting the battery 17 to the PDU 161 and is associated with resistance element RbP. Thus, a fault relating to connection of the power cable to the battery will be detected if the known resistance of resistance element RbP is measured, either locally by the battery controller 20 or as part of the total resistance value by any controller within the control system 111.

Interlock circuit portion 104*i* is configured to monitor the state of the battery disconnection switch 170 and is associated with resistance element RnMSD. Thus, a fault relating to the battery disconnect switch 170 being open will be detected if the known resistance of resistance element RRbMSD is measured, either locally by the battery controller 20 or as part of the total resistance value by any controller within the control system 111.

In the depicted embodiment, the battery section of the interlock circuit 104 is configured such that opening the lid switch 168*c* opens the battery section of the interlock circuit. Thus, if the battery controller 20 detects an open circuit condition on the interlock circuit, then the battery controller is configured to determine that the lid switch 168*c* is open. In another embodiment, the battery section of the interlock circuit 104 may be configured with a portion of the interlock circuit dedicated to measuring the connection of the lid switch 168*c* and with a corresponding resistance value. Likewise, the battery section of the interlock circuit 104 may be configured such that the open circuit condition occurs at a different portion of the circuit and is associated with a different function, such as disconnection of the power cord to the PDU or opening of the battery disconnect switch 170.

As described above, the depicted embodiment includes an HVIL system that includes two separate HVIL circuits 104 and 106. Here, a propulsion side of the power circuit is monitored by propulsion interlock circuit 106 which runs through aspects of the motor/inverter 164 system. The propulsion interlock circuit 106 includes multiple interlock circuit portions 106*a*-106*b*. The interlock circuit portion 106*a* is configured to monitor connection of the lid switch 168*a* for the motor/inverter 164 and is associated with resistance element RinvLS. Thus, a fault relating to the access port of the marine drive cowling housing the motor/inverter being open will be detected if the known resistance of resistance element RinvLS is measured, either locally by the motor controller 14 or as part of the total resistance value by any controller within the control system 111.

The interlock circuit portion 106*b* is configured to monitor connection of the motor-end connector of the cable connecting the motor/inverter 164 to the PDU 161 and is associated with resistance element Rinv. Thus, a fault relating to connection at the motor end of the power circuit will be detected if the known resistance of resistance element Rinv is measured, either locally by the motor controller 14 or as part of the total resistance value by any controller within the control system 111.

Resistance measurements and/or detection of fault conditions performed at each local controller 14, 20, 180, 182 may be transmitted to a central controller 12 where the central controller may identify the fault condition based on the transmitted information and may generate commands to effectuate the fault response. As one example, the motor controller 14, depicted as a motor/inverter control unit, may measure the resistance of each of the propulsion interlock circuit portions 106*a*, 106*b*. The motor controller 14 may detect an increase in resistance from resistance element RinvLS within the interlock circuit portion 106*a* when the cowl lid switch 168*a* disconnects due to the access port of the motor cowling being opened for maintenance or inspection. Upon detection of the resistance element RinvLS, the motor controller 14 communicates the fault condition to the central controller 12 which may deactivate (or diable activation of) the motor and/or inverter 164. Upon detection the resistance element Rinv within the interlock circuit portion 106*b*, the motor controller 14 and/or the central controller 12 may be configured to deactivate (or disable activation of) the motor/inverter 164 such that it cannot be turned on.

Unique resistance values on different sides of a portion of the power circuit, such as resistance elements RpduIS and Ris (that span both sides of the connection between the PDU and the isolation monitor 166) may be used to identify which side of the connection is associated with the fault condition, which may result in different fault responses. In one embodiment, the power control system 111 may be configured to provide redundancies, thus providing robust fault detection mechanisms. For example, measurements received at the central controller 12 from each local controller, such as the battery controller 20 and the PDU controller, may be compared to a total resistance-based fault assessment performed by central controller 12 and/or compared to other measurements by the central controller 12, whereby the two sets of similar resistance measurements and/or fault detection(s) may be used confirm a fault condition and its location and wherein the central controller 12 may be configured with logic for further identifying fault conditions based one conflicting fault information from any of the various local controllers.

In one embodiment, the battery controller 20 is configured to measure the total resistance of the storage interlock circuit 104 and to generate a battery-identified fault condition based on the comparison between the total resistance and plurality of unique resistance values. The battery controller 20 may be configured to communicate the total resistance and the battery-identified fault condition to the central controller 12, wherein the central controller is configured to conduct a system-wide fault condition assessment and final determination based on its own analysis of the local resistance values, the total resistance, and/or battery-identified fault condition from the battery controller 20.

Figure 6:
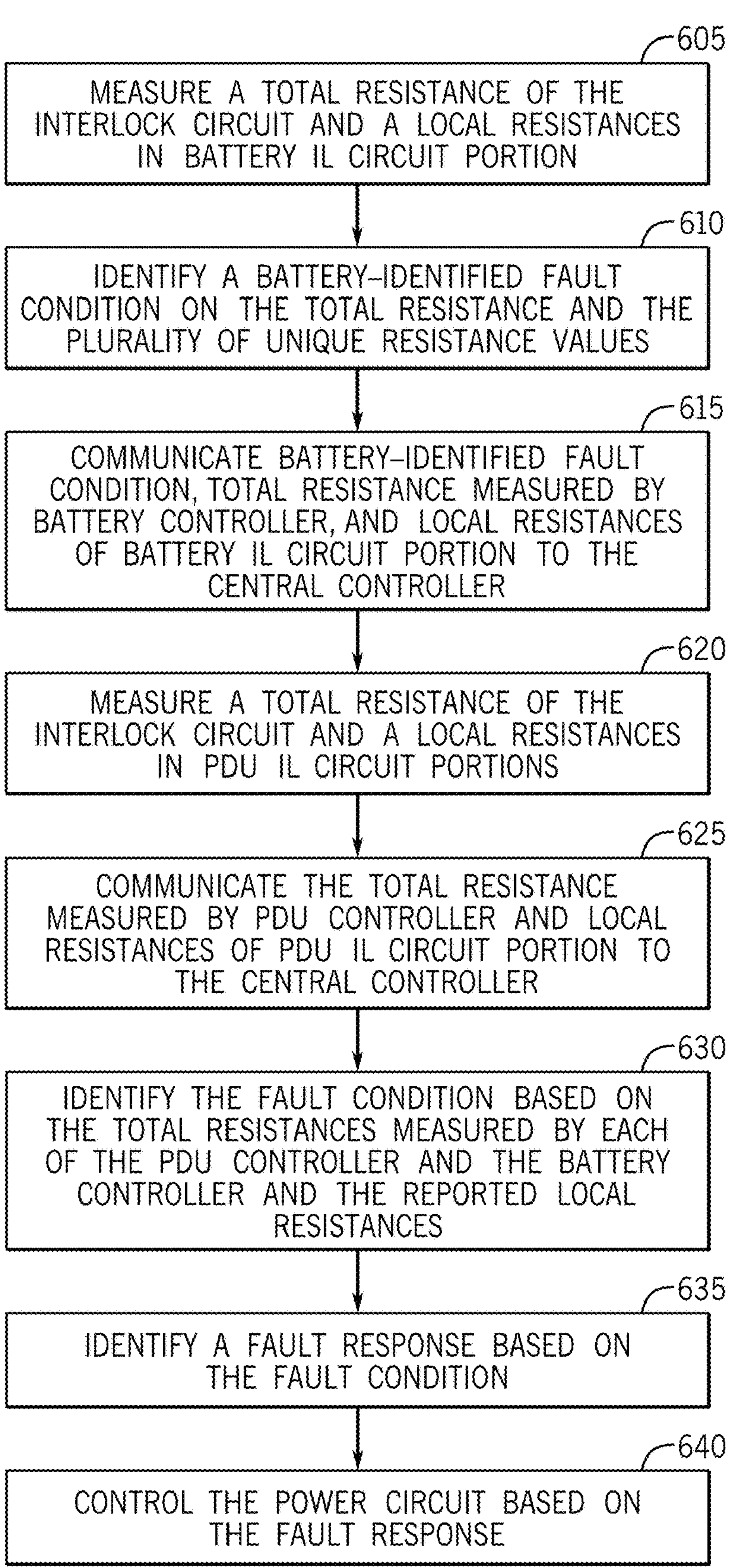

The control system is configured to measure a local resistance of each of the plurality of interlock circuit portions 104*a*-104*i* and 106*a*-106*b*. FIG. 6 illustrates the PDU section of the storage interlock circuit 104 that includes interlock circuit portions 104*b*, 104*c*, 104*d*, 104*e*, 104*f*, 104*g*. The PDU controller 182 is configured to measure the local resistance of each of the plurality of interlock circuit portions 104*b*, 104*c*, 104*d*, 104*e*, 104*f*, 104*g* in the PDU section. The PDU controller 182 may be configured to communicate the local resistances to the central controller 12, which is configured to identify a fault condition out of a plurality of possible fault conditions based on the local resistance of each of the interlock circuit portions 104*b*, 104*c*, 104*d*, 104*e*, 104*f*, 104*g*, identify a fault response based on the identified fault condition, and control the power circuit based on the fault response. The PDU section of the storage interlock circuit 104 may be configured to enable voltage at multiple locations so as to determine the local resistance of each interlock circuit portion. The control system may measure drops in voltage at voltage measurement points 185*a*, 185*b*, 185*c*, 185*d*, 185*e*, 185*f*, and thus across each resistance element RpduCCS, RpduBAT, RpduIS, RpduInv, RpduLS, RpduCON, and to determine the local resistance of each interlock circuit portion 104*b*, 104*c*, 104*d*, 104*e*, 104*f*, 104*g* accordingly. If the local resistance is equal to the known resistance value of the respective resistor—i.e., the respective one of RpduCCS, RpduBAT, RpduIS, RpduInv, RpduLS, RpduCON—then a corresponding fault condition is detected that identifies the source of the problem.

The control system is configured to associate each of the plurality of possible fault conditions detectable by the power control system 111 with a corresponding fault response. At least one fault response is associated with each fault condition detectable by the system 11. Additionally or alternatively, the fault response may be further based on an operation state of the power circuit. For example, the control system, such as via the central controller 12 may be configured to select one of a plurality of fault responses associated with a detected fault condition based on the operation state. Some examples of operation states of the power circuit include an off state, a propulsion state, and a charging state. In the off state, the marine drive is not being operated and the charger is not connected to the power circuit In the propulsion state, the marine drive is operating (e.g., the motor is spinning and is rotating the propeller to output a propulsion thrust). In the charging state, the at least one marine battery is being charged from an outside power source, such as shore power.

The fault responses to the various fault conditions may include a subset of potential actions appropriate for responding to the various detectable fault conditions, such as responses involving reducing or eliminating the amount of current being transferred in the power circuit 112. To this end, the fault response may include one or more of including at least one of disconnecting the marine battery(ies) 17 from the power circuit 112, disconnecting the marine drive (e.g., motor inverter 164) from the power circuit 112, controlling the at least one marine battery 17 to provide a reduced power amount on the power circuit 112 (e.g., power limiting the system to a max power level below the max power level provided during normal operating conditions), controlling the at least one marine drive to draw a reduced power draw (i.e., a max power draw below the max power draw permitted during normal operating conditions), and preventing charging of the at least one marine battery 17 through the charger (e.g. but opening a switch or diableing the charger section of the PDU 161).

Alternatively or additionally, the fault response may include conducting a plausibility check. A plausibility check may include a cross check with the communication bus, such as a CAN or LIN bus, to determine whether a fault detected on the communication bus corresponds with the fault detected on the interlock circuit 104, 106. The plausibility check may include confirming if there is a removed connector. If there is a connector that is not fully inserted or is becoming disconnected, communication by the disconnected element on the communication bus will also be disrupted.

Alternatively or additionally, the fault response may include actions related to documenting the detected fault action (such as storing a fault code associated with the fault condition in memory accessible by or comprising part of the control system 111). Thereby, a technician attending to the propulsion system will have immediate access to information identifying the source of the fault and will not have to spend unneeded time troubleshooting to identify the problem.

Alternatively or additionally, the fault response may include generating an alert to a user identifying the existence of a fault, identifying the specific fault condition identified, identifying the fault response, and/or providing instructions to the user to remediate the fault (if possible). Such an alert may be provided on a user interface 35. For example, if the fault condition is related to one of the lid switches **168*b*** being open, then the fault response may include an alert to the user that the marine drive is disabled to the lid switch being open and to close the lid switch to remove the fault and enable operation of the drive. In some embodiments, all fault responses to the various fault conditions include some form of fault alert and fault documentation steps.

The fault response to a particular fault condition (e.g., which subset of potential actions included in the fault response) may be selected based on the operating state. In certain operating states, such as in the propulsion state, preservation of the propulsion output may be prioritized. For example, when the operation state is a propulsion state, such as when the marine drive is being operated to output a propulsion thrust, a fault condition is detected in the propulsion interlock circuit and/or the marine battery may be associated with a fault response of reducing the maximum current to 50% and conduct a plausibility check with the PDU and the central controller 12. Similarly, if a fault condition is detected that is associated with the charger, the fault response may include disabling charging and warning the operator of the charging disabling, while maintaining full discharge power of the battery and full propulsion authority to operate the marine drive. Accordingly, the control system may be configured to allow continued use of the marine drive to avoid stranding the user in the middle of a body of water without a means of obtaining assistance. Even if a fault condition is detected in the propulsion interlock circuit and/or the marine battery or there is some risk of damage to the electric marine propulsion system, the control system may prioritize reduced continued operation to prioritize getting the marine vessel back to shore. This is contrasted with an off state or a charging state, wherein if a fault condition is detected in the propulsion interlock circuit and/or the marine battery, fault response may include preventing the marine drive from turning on and/or the propulsion system from being engaged.

To provide other examples, when the operation state is an off state a detected fault condition in the propulsion interlock circuit 106 may be associated with a fault response that includes preventing the marine drive from turning on or disconnecting the marine drive from the propulsion power circuit portion **112*a*, such as by disabling the inverter 164**. As another example, when the operation state is an off state, detection of a fault condition associated with the charger may be associated with a fault response of preventing or disallowing charging on the battery, while retaining full discharge power and full propulsion. Similarly, a fault condition associated with the marine battery may be associated with a fault response that includes preventing, disconnecting, or disallowing the battery from being turned on.

When the operation state is a charging state, such as when the marine battery is being charger from an outside power source, if a fault condition is detected in the propulsion interlock circuit 106, the fault response may include preventing the marine drive from turning on and/or disabling the inverter and motor. If a fault condition is associated with the charger, fault response may include preventing or disallowing charging while allowing full discharge power and full propulsion authority. If a fault condition associated with the marine battery is detected, the control system may engage a fault response that includes preventing or disallowing charging and/or powering on the battery.

Figures 4, 5:
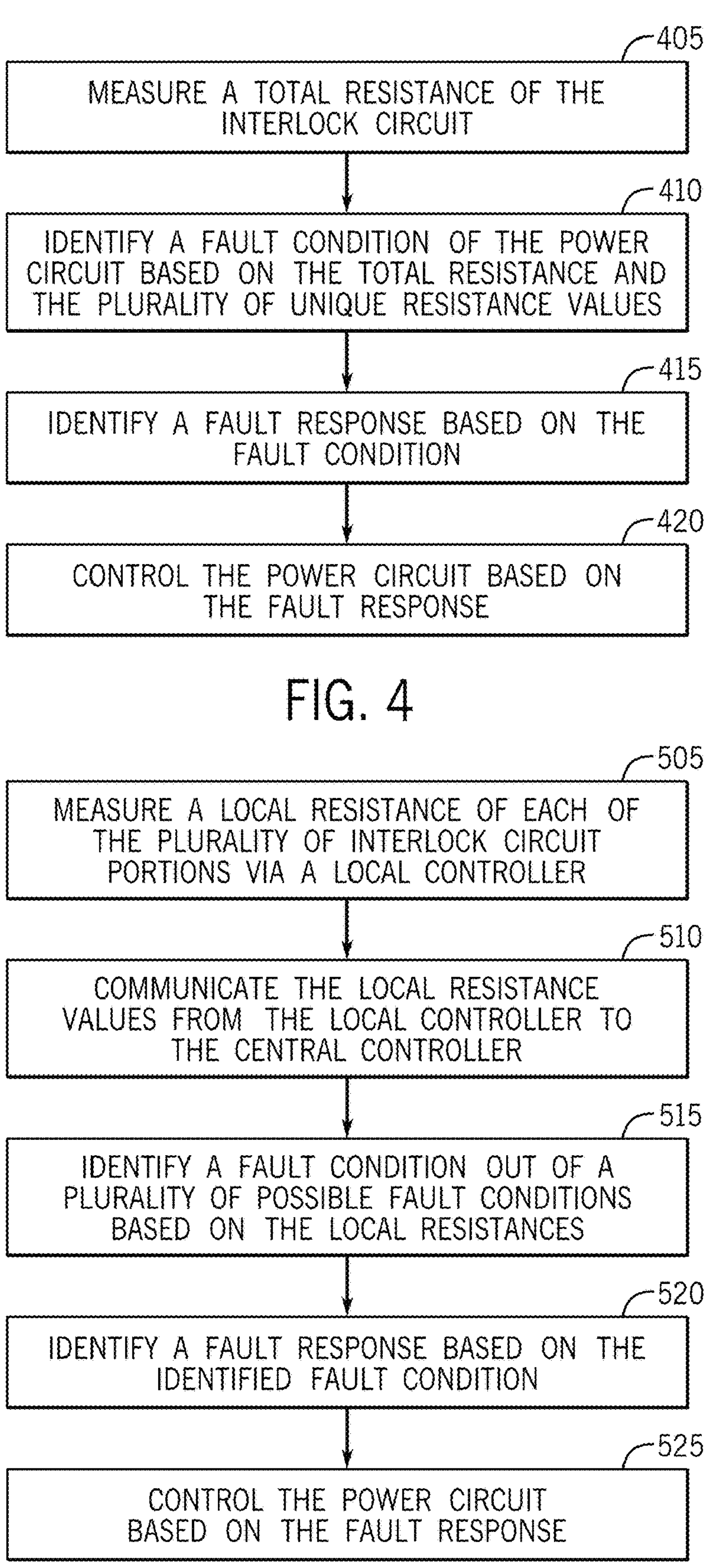
FIGS. 4-6 illustrate exemplary methods for controlling high voltage system for a marine vessel in accordance with the present disclosure.

FIG. 4 illustrates an exemplary method for controlling a high voltage system on a marine vessel. At 405, a total resistance of the interlock circuit is measured. In one embodiment, the total resistance of the interlock circuit is measured with an AC current, wherein the AC current is a biased sine wave. At 410, a fault condition of the power circuit is identified by the control system based on the total resistance and the plurality of unique resistance values. At 415, a fault response is identified based on the fault condition. At 420, the power circuit is controlled by the control system based on the fault response. Corresponding fault responses may include at least one of: disconnecting the at least one marine battery from the power circuit, disconnecting the marine drive from the power circuit, controlling the at least one marine battery to provide a reduced power amount on the power circuit, controlling the at least one marine drive to draw a reduced power draw, preventing charging of the at least one marine battery, conducting a plausibility check, generating an alert on a user interface, and storing a fault code associated with the fault condition.

FIG. 5 illustrates another exemplary method for controlling a high voltage system on a marine vessel. At 505, a local resistance of the plurality of interlock circuit portions is measured via a local controller. The interlock circuit portions are each configured to indicate connectivity of a respective portion of the power circuit, including a connection of a charger, an inverter, a DC/DC converter, an isolation monitor, and/or a lid switch, and wherein the fault condition indicates which of the marine battery, the charger, the DC/DC converter, the inverter, the isolation monitor, and/or the lid switch is a source of the fault. In one embodiment, the interlock circuit is configured such that each of the resistance elements is in parallel with the associated interlock circuit portion, wherein identifying the fault condition includes determining that at least one of the local resistances is equal to the unique resistance value for the respective resistance element. At 510, the local resistance values from the local controller are communicated to the central controller. At 515, a fault condition is identified by the control system out of a plurality of possible fault conditions based on the local resistances. For example, the central controller is configured to identify the fault condition based on the local resistance of each of the interlock circuit portions. At 520, a fault response is identified by the control system based on the identified fault condition. At 525, the power circuit is controlled based on the fault response.

FIG. 6 illustrates an exemplary method for controlling a high voltage system on a marine vessel. At 605, a total resistance of the interlock circuit and a plurality local resistances in the battery interlock circuit portion is measured by the control system. At 610, a battery-identified fault condition is identified by the control system on the total resistance and the plurality of unique resistance values, as well as based on the local resistance values of the battery section of the interlock circuit. At 615, the battery-identified fault condition, total resistance measured by the battery controller, and the local resistances of the battery interlock circuit portion are communicated from the battery controller 20 to the central controller. At 620, a total resistance of the interlock circuit and the local resistances in the PDU section of the interlock circuit is measured by the control system, such as the PDU controller 182. At 625, the total resistance and local resistances of the PDU interlock circuit portions measured by the PDU controller 182 are communicated to the central controller 12. At 630, the fault condition is identified by the control system based on the total resistances measured by each of the PDU controller and the battery controller and the reported local resistances. For example, the central controller 12 is configured to identify the fault condition based on a comparison between the total resistances of the interlock circuit measured by each of the battery controller and the PDU controller and the plurality of unique resistance values. The central controller may be configured to also identify the fault condition based on the local resistance of each of the interlock circuit portions and to compare that determined fault condition to the one identified based on the total resistances and to the battery-identified fault condition. If all values consistent, then the fault condition is outputted. If an inconsistency is detected, then further logic is executed based on the inconsistency to identify the fault condition (which may include a plausibility check). At 635, a fault response is identified by the control system based on the fault condition. At 640, the power circuit is controlled based on the fault response.

This written description uses examples to disclose the invention, including the best mode, and also to enable any person skilled in the art to make and use the invention. Certain terms have been used for brevity, clarity, and understanding. No unnecessary limitations are to be inferred therefrom beyond the requirement of the prior art because such terms are used for descriptive purposes only and are intended to be broadly construed. The patentable scope of the invention is defined by the claims and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

What is claimed is:

1. A power control system for controlling a power circuit of an electric marine propulsion system, wherein the power circuit delivers power from at least one marine battery to a marine drive configured to propel a marine vessel, the power control system comprising:

at least one interlock circuit electrically isolated from the power circuit, the interlock circuit comprising:

a plurality of interlock circuit portions, each interlock circuit portion configured to indicate connectivity of a corresponding portion of the power circuit;

a plurality of resistance elements each having a predetermined resistance value, including a resistance element associated with each of the interlock circuit portions;

a control system configured to:

measure a local resistance of each of the plurality of interlock circuit portions so as to measure a plurality of local resistances throughout the interlock circuit;

identify a fault condition out of a plurality of possible fault conditions based on the local resistance of each of the interlock circuit portions;

identify a fault response based on the identified fault condition; and control the power circuit based on the fault response.

2. The system of claim 1, wherein the control system is configured to associate each of the plurality of possible fault conditions with a corresponding fault response.

3. The system of claim 2, wherein the fault response is further based on an operation state of the power circuit.

4. The system of claim 2, wherein each of the corresponding fault responses includes at least one of disconnecting the at least one marine battery from the power circuit, disconnecting the marine drive from the power circuit, controlling the at least one marine battery to provide a reduced power amount on the power circuit, controlling the at least one marine drive to draw a reduced power draw, preventing charging of the at least one marine battery, conducting a plausibility check, generating an alert on a user interface, and storing a fault code associated with the fault condition.

5. The system of claim 1, wherein the at least one interlock circuit is configured such that each of the plurality of resistance elements is in parallel with the associated interlock circuit portion, and wherein the control system is further configured to identify the fault condition based on the local resistance being equal to the predetermined resistance value for the respective resistance element.

6. The system of claim 5, wherein the at least one interlock circuit is configured such that each interlock circuit portion provides a short circuit across the respective resistance element when the corresponding portion of the power circuit is connected such that the local resistance for that interlock circuit portion is effectively zero when the corresponding portion of the power circuit is connected.

7. The system of claim 1, wherein each of the plurality of resistance elements is configured to have a unique resistance value, and wherein the control system is configured to measure a total resistance of each of the at least one interlock circuit and to identify the fault condition based on a comparison between the total resistance and the plurality of unique resistance values.

8. The system of claim 7, wherein the control system includes at least one battery controller for the at least one marine battery, wherein the at least one battery controller is configured to measure the total resistance of the interlock circuit, to generate a battery-identified fault condition based on the comparison between the total resistance and plurality of unique resistance values.

9. The system of claim 8, wherein the control system further includes a central controller, wherein the battery controller is configured to communicate at least one of the total resistance and the battery-identified fault condition to the central controller, and wherein the central controller is configured to identify the fault condition based on the local resistance of each of the interlock circuit portions and/or the total resistance or battery-identified fault condition.

10. The system of claim 1, wherein the control system is configured to measure a total resistance of the at least one interlock circuit and/or each of the local resistances using an AC current.

11. The system of claim 10, wherein the AC current is a biased sine wave wherein the AC current is maintained above zero.

12. The system of claim 1, wherein the at least one interlock circuit includes at least two independent interlock circuits, including a propulsion interlock circuit configured to indicate connectivity of a propulsion power circuit portion of the power circuit connected to the marine drive and a storage interlock circuit configured to indicate connectivity of the at least one marine battery.

13. The system of claim 12, wherein the storage interlock circuit further includes interlock circuit portions each configured to indicate connectivity of a respective portion of the power circuit, including a connection of a charger, an inverter, a DC/DC converter, an isolation monitor, and/or a lid switch, and wherein the fault condition indicates which the marine battery, the charger, the DC/DC converter, the inverter, the isolation monitor, and/or the lid switch is a source of the fault.

14. A method of a power circuit of an electric marine propulsion system, wherein the power circuit delivers power from at least one marine battery to a marine drive configured to propel a marine vessel, the method comprising:

providing at least one interlock circuit electrically isolated from the power circuit, the at least one interlock circuit comprising a plurality of interlock circuit portions, each interlock circuit portion configured to indicate connectivity of a corresponding portion of the power circuit and comprising a resistance element with a unique resistance value such that interlock circuit comprises a plurality of unique resistance values;

measuring a total resistance of the interlock circuit;

identifying a fault condition of the power circuit based on the total resistance and the plurality of unique resistance values;

identifying a fault response based on the fault condition; and controlling the power circuit based on the fault response.

15. The method of claim 14, wherein the fault condition is a selected one of a plurality of possible fault conditions for the power circuit, and wherein each of the plurality of possible fault conditions has a corresponding fault response.

16. The method of claim 15, wherein the fault response is identified further based on an operation state of the marine drive.

17. The method of claim 15, wherein each of the corresponding fault responses includes at least one of disconnecting the at least one marine battery from the power circuit, disconnecting the marine drive from the power circuit, controlling the at least one marine battery to provide a reduced power amount on the power circuit, controlling the at least one marine drive to draw a reduced power draw, preventing charging of the at least one marine battery, and conducting a plausibility check, generating an alert on a user interface, and storing a fault code associated with the fault condition.

18. The method of claim 14, further comprising:

measuring a local resistance of each of the plurality of interlock circuit portions so as to measure a plurality of local resistances throughout the interlock circuit; and identifying the fault condition based further on plurality of local resistances.

19. The method of claim 18, wherein the at least one interlock circuit is configured such that each of the resistance elements is in parallel with the associated interlock circuit portion, wherein identifying the fault condition includes determining that at least one of the local resistances is equal to the unique resistance value for the respective resistance element.

20. The method of claim 14, further comprising, with at least one battery controller, measuring the total resistance of the interlock circuit and comparing the total resistance and the plurality of unique resistance values to generate a battery-identified fault condition, and communicating the battery-identified fault condition to a central controller; and with the central controller, measuring the total resistance of the interlock circuit, identifying the fault condition based on the total resistance, plurality of unique resistance values, and further based on the battery-identified fault condition.

21. The method of claim 14, measuring the total resistance of the at least one interlock circuit with an AC current, wherein the AC current is a biased sine wave.

22. The method of claim 14, wherein interlock circuit portions are each configured to indicate connectivity the at least one marine battery, the marine drive, a charger, an inverter, an isolation monitor, and/or a lid switch, and wherein method further includes identifying which of the at least one marine battery, the marine drive, the charger, the inverter, the isolation monitor, and/or the lid switch is a source of the fault condition based on the total resistance and the plurality of unique resistance values.

* * * * *